United States Patent
Maimone et al.

(10) Patent No.: US 11,423,814 B2
(45) Date of Patent: Aug. 23, 2022

(54) WEARABLE DISPLAY WITH COHERENT REPLICATION

(71) Applicant: Facebook Technologies, LLC, Menlo Park, CA (US)

(72) Inventors: Andrew Maimone, Duvall, WA (US); Douglas Robert Lanman, Bellevue, WA (US); Grace Kuo, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 246 days.

(21) Appl. No.: 16/053,720

(22) Filed: Aug. 2, 2018

(65) Prior Publication Data
US 2020/0043391 A1    Feb. 6, 2020

(51) Int. Cl.
| | | |
|---|---|---|
| G09G 3/00 | (2006.01) | |
| G02B 27/01 | (2006.01) | |
| G09G 3/20 | (2006.01) | |

(52) U.S. Cl.
CPC ......... *G09G 3/001* (2013.01); *G02B 27/0172* (2013.01); *G09G 3/2003* (2013.01); *G02B 2027/0123* (2013.01); *G02B 2027/0134* (2013.01); *G02B 2027/0178* (2013.01); *G09G 2320/0666* (2013.01); *G09G 2354/00* (2013.01)

(58) Field of Classification Search
CPC ................. G09G 3/001; G09G 3/2003; G09G 2320/0666; G09G 2354/00; G09G 3/00; G02B 27/0172; G02B 2027/0123; G02B 2027/0134; G02B 2027/0178; G02B 2027/0187; G02B 27/017; G02B 5/0221; G02B 27/0093
See application file for complete search history.

(56) References Cited

U.S. PATENT DOCUMENTS

| | | | | |
|---|---|---|---|---|
| 9,406,166 | B2 | 8/2016 | Futterer | |
| 10,359,630 | B2* | 7/2019 | Raval | G02B 27/0179 |
| 2007/0223071 | A1* | 9/2007 | Cameron | G03H 1/22 |
| | | | | 359/9 |
| 2008/0239457 | A1* | 10/2008 | Scott | G01J 3/26 |
| | | | | 359/291 |
| 2009/0095912 | A1* | 4/2009 | Slinger | G06T 1/0007 |
| | | | | 250/363.06 |

(Continued)

FOREIGN PATENT DOCUMENTS

| | | |
|---|---|---|
| WO | 2007045875 | 4/2007 |
| WO | 2014209244 | 12/2014 |

OTHER PUBLICATIONS

PCT/US2018/045670 Search Report dated May 7, 2019.
(Continued)

*Primary Examiner* — Lunyi Lao
*Assistant Examiner* — Jarurat Suteerawongsa
(74) *Attorney, Agent, or Firm* — Pequignot + Myers; Matthew A. Pequignot

(57) ABSTRACT

A wearable display with coherent replication of optical beams is presented. The display includes a replication element comprising a plurality of features configured to receive and split impinging light into a plurality of sub-beams for propagation in a plurality of directions. At least a portion of the split sub-beams propagating in a direction of an eyebox of the NED form an image by optical interference.

13 Claims, 13 Drawing Sheets

(56) References Cited

U.S. PATENT DOCUMENTS

| | | | | |
|---|---|---|---|---|
| 2010/0103485 A1* | 4/2010 | Haussler | ............... | G03H 1/02 |
| | | | | 359/9 |
| 2011/0149018 A1* | 6/2011 | Kroll | ............... | G03H 1/02 |
| | | | | 348/40 |
| 2013/0135892 A1* | 5/2013 | Lee | ............... | G02B 6/0031 |
| | | | | 362/602 |
| 2013/0222384 A1* | 8/2013 | Futterer | ............... | G02B 6/0016 |
| | | | | 345/426 |
| 2016/0026253 A1* | 1/2016 | Bradski | ............... | H04N 13/167 |
| | | | | 345/8 |
| 2016/0379606 A1* | 12/2016 | Kollin | ............... | G06T 3/4038 |
| | | | | 345/428 |
| 2017/0129272 A1* | 5/2017 | Rich | ............... | B42D 25/342 |
| 2018/0120566 A1* | 5/2018 | Macnamara | ............... | G06T 19/006 |

OTHER PUBLICATIONS

International Preliminary Report on Patentability for International Application No. PCT/US2018/045670, dated Feb. 11, 2021, 08 Pages.

* cited by examiner

WEARABLE DISPLAY WITH COHERENT REPLICATION

TECHNICAL FIELD

The present disclosure relates to visual displays and display systems, and in particular to wearable displays and methods therefor.

BACKGROUND

Head mounted displays (HMDs) are used to provide virtual scenery to a user, or to augment real scenery with additional information or additional virtual objects. The virtual or augmented scenery can be three-dimensional (3D) to enhance the virtual experience, and to match virtual objects to the real 3D scenery observed by the user. In some HMD systems, a head and/or eye position and orientation of the user are tracked, and the displayed 3D scenery is adjusted in real time depending on the user's head orientation and gaze direction, to provide an illusion of immersion into a simulated or augmented 3D scenery.

One approach to providing a virtual 3D scenery is to display stereoscopic images by generating separate images to each eye of the user. A display system can have a discrepancy between eye vergence and visual distance accommodation by user's eyes, known as vergence-accommodation conflict. In a wearable display system, an on-the-fly focus adjustment may lessen the vergence-accommodation conflict. The focus adjustment may be made dependent on a virtual scene being displayed, a gaze direction of the user's eyes, etc.

In a coherent holographic display, a light field of an object is created or reproduced in 3D space for direct observation, or for indirect observation using eyepieces. Nonetheless, holographic displays have not found a widespread use as yet. One of key factors limiting the practical use of holographic visual displays is lack of a holographic spatial light modulator (SLM) with required spatial resolution.

BRIEF DESCRIPTION OF THE DRAWINGS

Exemplary embodiments will now be described in conjunction with the drawings, in which.

DETAILED DESCRIPTION

Figure 1:
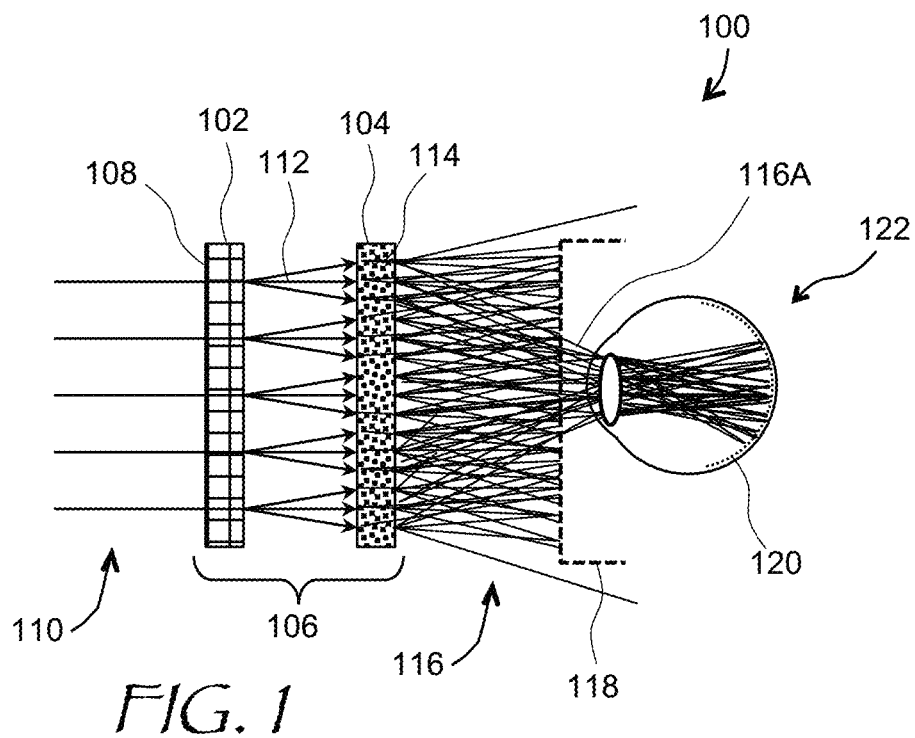
FIG. 1 is a schematic side view of a coherent near-eye display (NED) of the present disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

A three-dimensional light field generated by a holographic display hosts a wealth of information. In a practical application scenario, only a small amount of this information is perceived and visually registered by a user. For example, a human visual acuity has a value of about 1 arc minute in the area of foveal vision, and falls of sharply with angle. As another example, a human eye can only focus at one visual distance at any given time. Thus, the information contained in scenery presented by a holographic display is only partially perceived by a human user. Accordingly, it is advantageous to provide a display system capable of selectively enhancing image quality in areas of maximum impact on the perceived image quality, e.g. in a direction of viewing. Furthermore, it is advantageous to provide a system where the selective and dynamically adaptable image quality enhancement is achievable via software, without having to rely on dedicated customized hardware such as electronic displays with spatially varying pixel pitch.

In accordance with the present disclosure, there is provided a near-eye display (NED) comprising a spatial light modulator (SLM) comprising a plurality of pixels for controlling at least one of amplitude, phase, or polarization of an optical beam impinging thereon. The optical beam may include spatial beam components corresponding to individual pixels of the SLM. A replication element may include a plurality of features configured to receive and split the spatial beam components into a plurality of sub-beams for propagation in a plurality of directions, such that in operation, at least a first portion of the sub-beams split from different spatial beam components and propagating in a direction of an eyebox of the NED interfere to obtain an image of an object.

The SLM may be a phase SLM, an amplitude SLM, a polarization SLM, or a combination thereof. The replication element may, but does not have to, be disposed downstream of the SLM. The replication element may include a plurality of light-scattering features pseudo-randomly disposed across an aperture of the replication element. The light-scattering features may be configured to send the sub-beams in pseudo-random directions. The features of the replication element may be configured to provide multiple overlapping copies of wavefront of the corresponding impinging spatial beam components for propagating at different, e.g. pseudo-random, angles. In an embodiment, the features of the replication element are configured to direct the sub-beams predominantly in a direction of the eyebox. The distribution of the directions may be uniform.

The replication element may include a reflective element. In some embodiments, the replication element includes at least one of: a phase mask, an amplitude mask, a polarization mask, a refractive surface, a diffuser, a diffraction grating, a holographic grating, a metasurface, or a microlens array. The replication element may include at least one of: a volume hologram, a polarization-sensitive element, a metasurface, or a time-multiplexed switchable element. The replication element may be configured to split the spatial beam components into the plurality of sub-beams, and to propagate an external image light substantially without change of a wavefront or spatial power density distribution of the external image light for at least one of: a duration of time, a pre-defined spectral band, or a pre-defined polarization of the external image light. The replication element may be supported by an optical waveguide, and may be configured to increase etendue of the NED by up to eight times. In this embodiment, a maximum redirection angle of the replication element may be up to eight times larger than a maximum beam deviation angle of the SLM. In some embodiments, the sub-beams interfere directly on a retina of a user's eye.

A controller may be operably coupled to the SLM and configured to adjust the at least one of amplitude, phase, or polarization of the first portion of the sub-beams to make the sub-beams of the first portion interfere to obtain the image of the object. For embodiments where the sub-beams interfere on the retina of the user's eye, an eye tracking system may be provided for determining at least one of eye position or eye orientation of the user's eye. The controller may be configured to adjust the at least one of amplitude, phase, or polarization of the first portion of the sub-beams depending on the at least one of eye position or eye orientation determined by the eye tracking system.

In some embodiments, the controller is configured to adjust the SLM pixels to optimize the image of the object based upon a perceptual metric of the image. The perceptual metric may include at least one of: a range of spatial frequencies supported by a retina of a human eye for a portion of the image, perceptual importance of the object or a feature thereof, temporal consistency of the image, saliency of the object, or a range of lower image spatial frequencies supported by available degrees of freedom of the SLM. A coherent light source may be provided for generating the optical beam.

In accordance with the present disclosure, there is further provided a method of calibration of an NED described above. The method may include obtaining a perceptual metric of an image of an object formed by optical interference of at least a first portion of the sub-beams split from different spatial beam components and propagating in a direction of an eyebox of the NED, and adjusting the SLM pixels based on the perceptual metric of the image. The perceptual metric may include at least one of: a range of spatial frequencies supported by a retina of a human eye for a portion of the image, perceptual importance of the object or a feature thereof, temporal consistency of the image, saliency of the object, or a range of lower image spatial frequencies supported by available degrees of freedom of the SLM.

In accordance with the present disclosure, there is further provided an NED system comprising an image field source for providing an image field of an object on a retina of a user's eye, the image field source comprising an SLM and a replication element optically coupled thereto. The SLM may include a plurality of pixels for controlling at least one of amplitude, phase, or polarization of spatial components of an optical beam impinging thereon, and wherein the replication element comprises a plurality of features configured to receive and split each one of the spatial components of the optical beam into a plurality of sub-beams for propagation in a plurality of directions. The NED system may further include a controller operably coupled to the SLM and configured to adjust the at least one of the amplitude, phase, or polarization of at least a first portion of the sub-beams split from different spatial components of the optical beam and propagating in a direction of an eyebox of the NED to cause the at least first portion of the sub-beams interfere to obtain the image field of the object on the retina of the user's eye.

In some embodiments, the NED system further includes an eye tracking system for determining at least one of eye position or eye orientation of the user's eye. In such embodiments, the controller may be configured to adjust the at least one of the amplitude, phase, or polarization of the first portion of the sub-beams depending on the at least one of eye position or eye orientation determined by the eye tracking system. The controller may also be configured to adjust the SLM pixels to optimize the image of the object based upon a perceptual metric of the image. The perceptual metric may include at least one of: a range of spatial frequencies supported by a retina of a human eye for a portion of the image, perceptual importance of the object or a feature thereof, temporal consistency of the image, saliency of the object, or a range of lower image spatial frequencies supported by available degrees of freedom of the SLM.

The optical beam may include a time succession of color beams having different colors. The controller may be configured to adjust the at least one of the amplitude, phase, or polarization of at least the first portion of the sub-beams for each color beam, so as to cause the at least first portion of the sub-beams interfere to obtain a corresponding color component of the image field of the object on the retina of the user's eye. It may be preferable that the time succession of the color beams is rapid enough for the user's eye to integrate the color components of the image field of the object into a full-color image field.

Referring now to FIG. 1, a NED 100 includes an SLM 102 and a replication element 104. Together, the SLM 102 and the replication element 104 form an image field source 106. The SLM 102 has a plurality of pixels 108, typically a 2D array of pixels, for controlling at least one of amplitude, phase, or polarization of a coherent optical beam 110 impinging on the SLM 102. For the purpose of explanation, it may be convenient to break down the optical beam 110 into spatial beam components 112, i.e. portions of the optical beam 110 corresponding to individual pixels 108 of the SLM 102.

The replication element 104 includes a plurality of features 114. The features 114 are configured to receive and split the spatial beam components 112 into a plurality of sub-beams 116 for propagation in a plurality of directions, e.g. pseudo-random directions as shown. In operation, at least a first portion 116a of the sub-beams 116 split from different ones of the spatial beam components 112 and propagating in a direction of an eyebox 118 of the NED undergo optical interference. The phase delay, the amplitude attenuation, and/or the polarization rotation of the spatial beam components 112 by the pixels 108 of the SLM 102 are controlled such that the optical interference of the first portion 116a of the sub-beams 116 split from different spatial beam components 112 results in formation of a desired image. In the embodiment shown in FIG. 1, the optical interference occurs directly at a retina 120 of an eye 122, i.e. the image is formed directly at the retina 120, which is shown in FIG. 1 with a thin dotted line, although the desired image can be also formed in free space for viewing via an eyepiece, for example.

The replicating element 104 creates sub-beams 116 from each single spatial beam component 112 of the optical beam 110. The optical paths of the sub-beams 116 end at different locations on the retina 120. Each spatial beam component 112 is controlled by a pixel 108 of the SLM 102. Accordingly, each pixel 108 controls amplitude, phase, and/or polarization of light impinging on the retina 120 at multiple locations on the retina 120. The locations controlled by different pixels 108 overlap one another, allowing independent control of optical power density of light at these locations via optical interference. To provide control of optical power density at a particular location on the retina 120, the pixels 108 of the SLM 102 can be adjusted to control amplitude, phase, and/or polarization of the corresponding spatial beam components 112 so that sub-beams 116 impinging on that particular location have the appropriate constructive or destructive interference. It is noted that the disposition of the SLM 102 and the replication element 104 may be reversed, i.e. the replication element 104 may be disposed upstream of the SLM 102 w.r.t. the optical beam 110. By the way of non-limiting examples, the replication element 104 may include a phase mask, an amplitude mask, a polarization mask, a refractive surface, a diffuser, a diffraction grating, a holographic grating, a metasurface, a microlens array, or a combination thereof.

Figure 2:
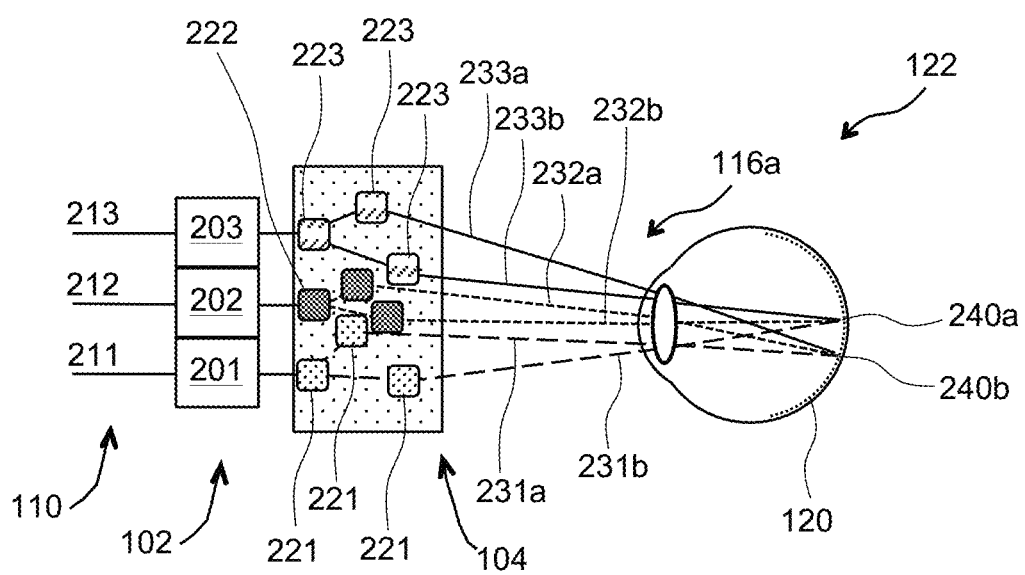
FIG. 2 is a schematic cross-sectional view illustrating multiple light paths in the NED of FIG. 1.

Referring to FIG. 2, an example of such multiple optical paths is presented. Only three pixels 201, 202, and 203 of the SLM 102 receiving three corresponding spatial beam components 211, 212, and 213 of the optical beam 110 are shown for brevity; in an actual device, many optical paths may be present simultaneously. The first spatial beam component 211 impinges on the first pixel 201, which adds a controllable optical phase delay (in this example) to the first spatial beam component 211. Then, the first spatial beam component 211 impinges on first features 221 of the replication element 104, which split the first spatial beam component 211 into multiple sub-beams, of which only two, 231a and 231b (long-dash lines), are shown. At least one feature 221 can split the spatial beam component 211 into multiple sub-beams. In this example, there are three such features and two split beams; in a real device, the number of beams and features can be much larger. Similarly, the second spatial beam component 212 impinges on the second pixel 202, and then impinges on second features 222 (dark squares), which split the second spatial beam component 212 into multiple sub-beams, of which only two, 232a and 232b, are shown in short-dash lines. The third spatial beam component 213 impinges on the third pixel 203, and then impinges on third features 223, which split the third spatial beam component 213 into multiple sub-beams of which only two, 233a and 233b, are shown in solid lines. The first sub-beams 231a, 232a, and 233a impinge at a first location 240a on the retina 120 of the user's eye 122, and undergo optical interference at that location. The second sub-beams 231b, 232b, and 233b impinge at a first location 240b on the retina 120 of the user's eye 122, and undergo optical interference at that location. By adjusting optical phase delays of the three pixels 201, 202, and 203, the optical power density at the two retina 120 locations 240a and 240b can be independently controlled. It is further noted that only a few pixels 201-203 and sub-beams 116a are shown in FIG. 2. In a practical display unit, multiple sub-beams from multiple pixels will undergo interference at multiple locations on the retina 120. Just one replication element 104 may be enough to provide the necessary number of sub-beams, and the features of the replication element 104 may be configured to direct the sub-beams predominantly in a direction of the eyebox 118. By properly controlling the SLM 102, the spatial density, clarity, and spatial resolution of a generated image on the retina 120 may be dynamically adjusted. A calibration and optimization procedure may need to be implemented for on-the-fly control of the SLM 102. The calibration and optimization will be considered further below.

Figure 3A:
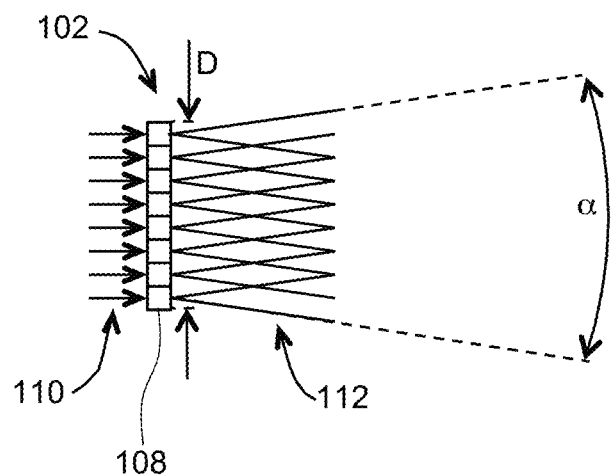
FIGS. 3A and 3B are schematic views of an image field source with (FIG. 3B) and without (FIG. 3A) a replicating element, illustrating etendue increase by the replicating element.
Figure 3B:
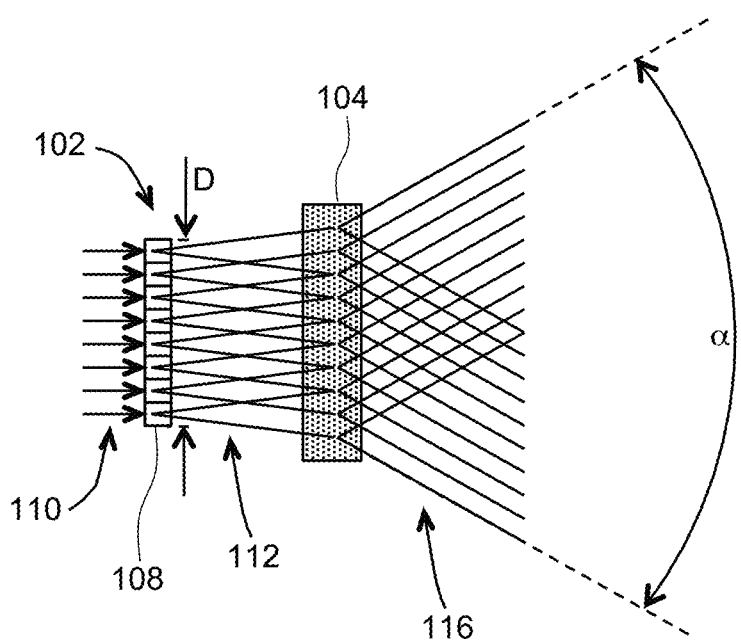

Some of the advantages of using the replication element 104 are illustrated in FIGS. 3A and 3B. Referring first to FIG. 3A, the SLM 102 has a linear dimension D and a beam deviation angle range $\alpha$, which is determined by a ratio of pixel pitch of the SLM 102 to a wavelength of the optical beam 110 in a trigonometric relationship. The smaller pixel pitch allows one to steer the spatial beam components 112 of the optical beam 110 in a wider angular range; yet, at a given linear dimension D, the smaller pixel pitch requires a larger number of the pixels 108, which is often limited by technology. A product of the linear, i.e. one-dimensional dimension D and the linear, i.e. one-dimensional, beam deviation angle range $\alpha$ is termed etendue. It is usually desirable to increase the etendue $D\alpha$ to simultaneously enable large eyeboxes and wide angles of view of a head-mounted display. The etendue $D\alpha$ is known to be a constant in an imaging system. For example, if a lens system is used to increase the deviation angle range $\alpha$, that lens system will reduce the linear dimension D by the same amount the linear deviation angle range $\alpha$ is increased, keeping the etendue $D\alpha$ constant.

It is the introduction of the replication element 104 that allows one to increase the etendue. Turning to FIG. 3B, the replication element 104 increases the beam deviation angle range $\alpha$ by splitting the spatial beam component 112 into multiple sub-beams 116. Thus, the etendue $D\alpha$ is increased. Another advantage is that, as noted above, the spatial density, clarity, and spatial resolution of a generated image may be dynamically adjusted e.g. via software to be high in important areas of the displayed virtual scene. The etendue Dα may be increased by a reasonable amount e.g. by no more than eight times, so that the number of addressable spatial beams does not exceed the number of degrees of freedom of the SLM by too large a factor. When the etendue Dα is increased too much, or the image quality (e.g. noise or contrast) may become unacceptable. In one embodiment, the etendue Dα increase is achieved by increasing a maximum redirection angle of the replication element 104. By way of an example, the maximum redirection angle is increased up to eight times as compared to a maximum beam deviation angle of the SLM 102.

The replication element 104 may be implemented in a variety of ways. For example, the replication element 104 may include a plurality of light-scattering features pseudo-randomly disposed across an aperture of the replication element 104. The light-scattering features may be configured to send the sub-beams in pseudo-random directions. In some embodiments, the light-scattering features are configured to provide multiple copies of the wavefront of impinging sub-beams for propagating at different angles, e.g. pseudo-random angles. Herein, the term "pseudo-random" is intended to mean a substantially uniform distribution, which may be obtained e.g. by providing a milky or roughened optical surface, such that the size, position, and orientation of individual light-scattering features of the roughened optical surface is not controlled, while an average size and surface roughness may be controlled. The substantially uniform distribution of directions may help to ensure that the resulting image at the retina 120 of the user's eye 122 does not include unwanted spatial modulations.

Figure 4A:
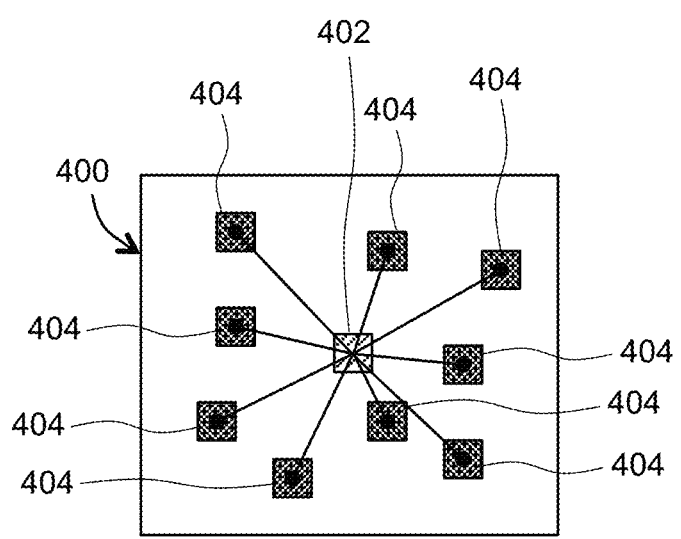
FIG. 4A is an angular-domain ray distribution plot illustrating sub-beam replication by the replication element.
Figure 4B:
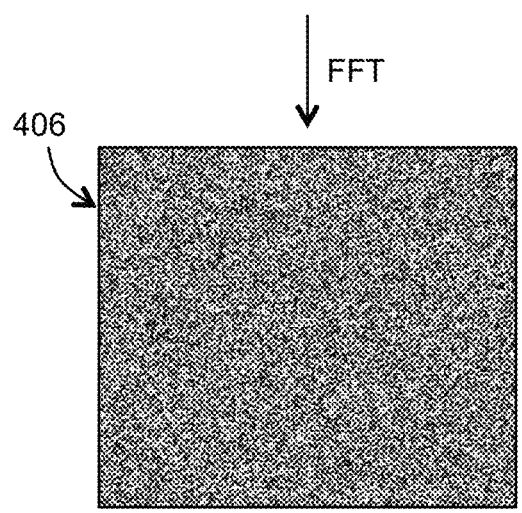
FIG. 4B is a spatial-domain optical phase delay distribution obtained by a Fourier transform of the angular-domain ray distribution of FIG. 4A.

Alternatively, one can provide an optical element with a specific, pre-configured randomized redirection angle distribution. The latter point is illustrated in FIGS. 4A and 4B. Referring to FIG. 4A, an angular-domain plot 400 of a replication element is presented. In FIG. 4A, each angle 402 is replicated to a plurality of angles 404, relative to angle 402. An inverse Fourier transform, e.g. an inverse fast Fourier transform (FFT) of the angular plot 400, can be performed to obtain an amplitude and/or a phase delay distribution 406 (FIG. 4B) of a mask to be used as a replication element. The mask may include an amplitude mask, a phase mask, a polarization mask (i.e. a layer with a space-variant polarization rotation spatially varying the phase), or any combination thereof. By way of a non-limiting example, a phase mask may be implemented in a slab of transparent material with a spatially varying thickness. The phase mask may comprise e.g. a refractive surface, a diffuser, a diffraction grating, a holographic grating, a microlens array, or any combination thereof. As far as the SLM 102 is concerned, a phase-only, amplitude-only, or both phase and amplitude SLMs based on e.g. a liquid crystal (LC) array such as liquid crystal on silicon (LCoS) array, a micro-electromechanical system (MEMS) array including piston-like or tiltable MEMS mirrors, or an optical phased array may be used.

Figure 5:
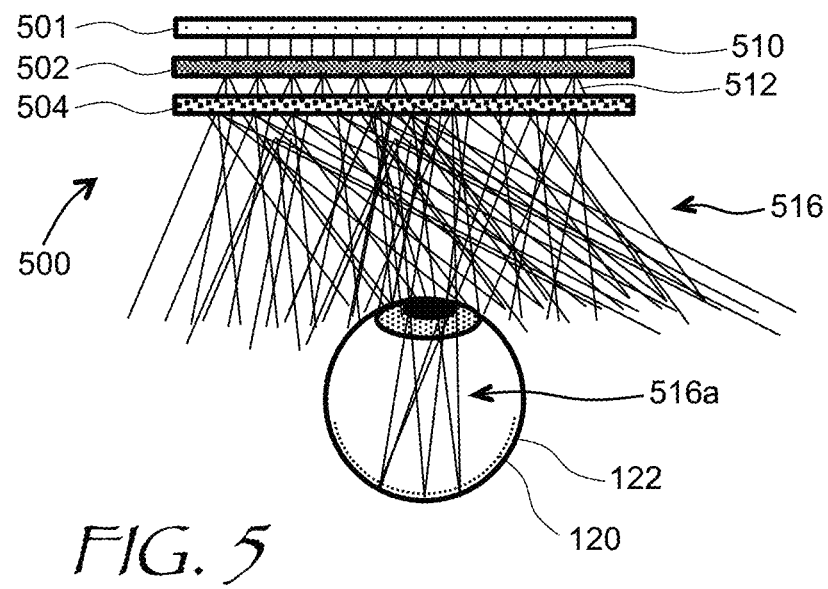
FIG. 5 is a schematic top view of an embodiment of a virtual reality (VR) display with coherent replication.

Many configurations of an NED with a replicating element are possible. Referring to FIG. 5, a virtual reality (VR) NED 500 includes a light source 501 generating a coherent optical beam 510, an SLM 502, and a replication element 504 arranged in a stack. The SLM 502 receives spatial beam components 512 and changes at least one of the amplitude, phase, or polarization of the corresponding spatial beam components 512, which then impinge onto the replication element 504. The replication element 504 splits each one of the spatial beam components 512 into a plurality of sub-beams 516 for propagation in a plurality of directions towards the eye 122. In operation, at least a portion 516a of the sub-beams propagating in a direction of an eyebox of the NED interfere to obtain an image of an object on the retina 120 of the eye 122.

Figure 6:
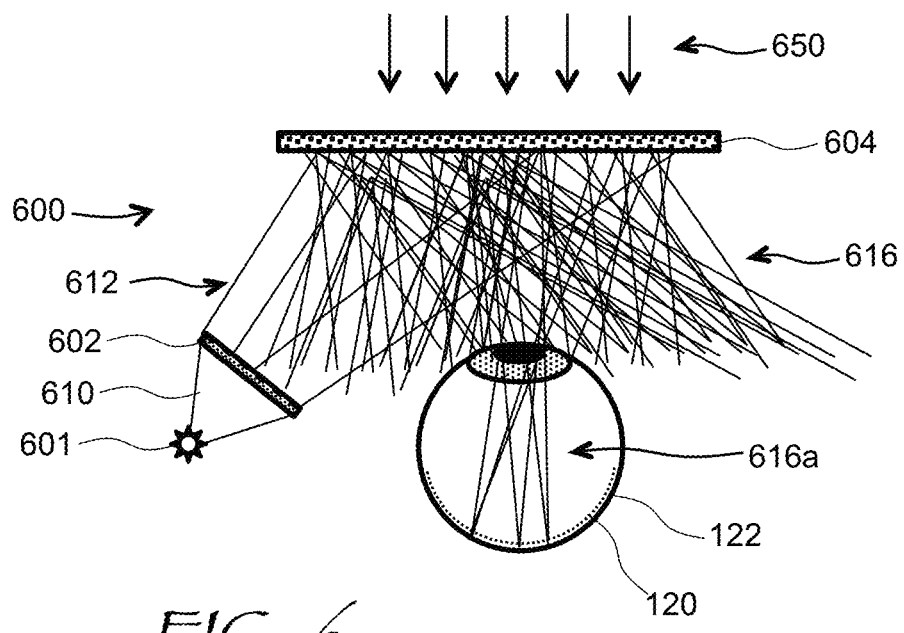
FIG. 6 is a schematic top view of an embodiment of an augmented reality (AR) display with coherent replication.

Referring to FIG. 6, an augmented reality (AR) NED 600 is similar to the VR NED 500 of FIG. 5. The AR NED 600 of FIG. 6 includes a light source 601 generating a divergent (in this embodiment) coherent optical beam 610, an SLM 602, and a replication element 604. The SLM 602 receives the divergent coherent optical beam 610 and changes a spatial distribution of optical characteristics of spatial beam components 612 of the coherent optical beam 610. The characteristics may include at least one of the amplitude, phase, or polarization. Spatial beam components 612 of the divergent coherent optical beam 610 carrying the modified optical beam characteristics impinge onto the replication element 604. The replication element 604 splits each one of the spatial beam components 612 into a plurality of sub-beams 616 for propagation in a plurality of directions towards the eye 122. At least a portion 616a of the sub-beams propagating in a direction of an eyebox of the NED interfere to obtain an image of an object on the retina 120 of the eye 122.

The replication element 604 receives and propagates an external image light 650 substantially without changes of a wavefront or spatial power density distribution of the external image light 650. To that end, the replication element 604 may include a volume hologram configured to reflect, split, and/or redirect the spatial beam components 612 substantially without impacting the external image light 650. A polarization volume hologram sensitive to polarization of the spatial beam components 612 may also be used, and image light 650 may be filtered to an orthogonal polarization. A wavelength-selective reflecting surface, or a metasurface including a metamaterial grating may be used, as well. In one embodiment, time-domain multiplexing (TDM) of external light and generated image light is used. For a TDM embodiment, the replicating element 604 may include a time-multiplexed switchable element such as a switchable liquid crystal diffraction grating, as an example. The switchable element may be synchronized with the light source 601 operating in pulsed regime, to provide the coherent diverging optical beam 610 in quick bursts, which are averaged by the eye 122. The above described variants of the replication element 604 may also be used in combination with each other. The external image light 650 may be propagated through the replication element 604 substantially without change of a wavefront or spatial power density distribution of the external image light 650 for at least one of: a duration of time i.e. a pre-defined time interval, a pre-defined spectral band i.e. a band excluding color channel bands of the light source 601 and the sub-beams 616, or a pre-defined polarization of the external image light 650, i.e. a polarization orthogonal to the polarization of the sub-beams 616.

Figure 7:
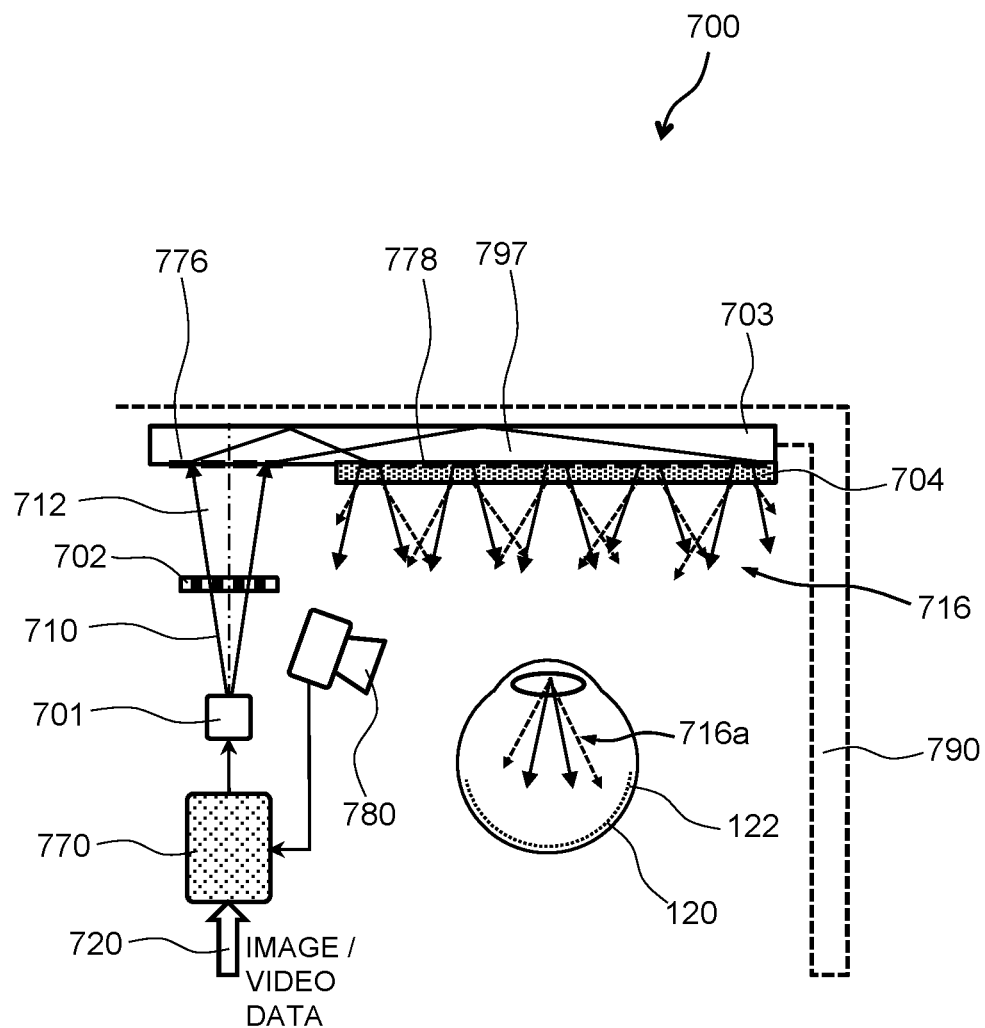
FIG. 7 is a schematic top view of an AR/VR coherent replication NED with a pupil-replicating waveguide.

Referring now to FIG. 7, an NED 700 includes a body 790 having a form factor of a pair of eyeglasses. Only one side is shown for brevity. A coherent light source 701 provides a divergent coherent optical beam 710. The NED 700 further includes an SLM 702, an optical waveguide 703, and a replication element 704 supported by the optical waveguide 703. An eye tracking system 780 is supported by the body 790 and is operably coupled to a controller 770, which is operably coupled to the SLM 702. In operation, the divergent coherent optical beam 710 generated by the coherent light source 701 impinges onto the SLM 702. The SLM 702 receives the divergent coherent optical beam 710 and changes a spatial distribution of optical characteristics of spatial beam components 712 of the coherent optical beam 710, which impinge onto the waveguide 703. An in-coupling diffraction grating 776 supported by the waveguide 703 causes the spatial beam components 712 to propagate in the waveguide 703 as shown at 797 from left to right as seen in FIG. 7. The top reflections may occur e.g. due to a total internal reflection (TIR) in the waveguide 703. An out-coupling diffraction grating 778 is supported by the waveguide 703. The function of the out-coupling diffraction grating 778 is to output a portion of the spatial beam components 712 impinging on the out-coupling diffraction grating 778. The out-coupling grating 778 may be sensitive to the angle, wavelength, and/or polarization of the incoming beam. The replicating element 704 is coupled to the out-coupling diffraction grating 778. The replicating element 704 functions similar to the above embodiments of the NED, that is, the replicating element 704 splits the spatial beam components 712 into a plurality of sub-beams 716 for propagation in a plurality of directions towards the eye 122, for forming an image of a virtual object on the retina 120 by optical interference of a portion 716a of the plurality of sub-beams 716 split from different spatial beam components 712.

The eye-tracking system 780 determines position and orientation, i.e. gaze direction, of the user's eye 122. The controller 770 receives the position and orientation of the user's eye 122 and, based on this information, controls the SLM 702 to generate the image on the retina 120 of the user's eye 122. To that end, the controller 772 may adjust at least one of the amplitude, phase, or polarization of the portion 716a of the sub-beams 716 to make the sub-beams of the first portion 716a interfere to obtain the image of the virtual object. The controller 770 converts image/video data 720 to SLM 702 frame data which, when uploaded to the SLM 702, cause the sub-beams of the first portion 716a to interfere to obtain optimal image/video on the retina 122. The SLM frame data may represent, for example, a phase delay and/or amplitude profile.

It is further noted that one set of SLM frame data generated by controller 770 may create images optimized with different image characteristics. For example, one set of SLM frame data may cause the displayed image to have a higher sharpness, contrast, image clarity, color saturation, etc. at the foveal region of the retina 120, at the cost of reduced sharpness, contrast, noise or other parameters at areas corresponding to peripheral vision. A particular set of SLM frame data can be used by the controller 770 that is optimized for some perceptual metric of the image. By way of non-limiting examples, the perceptual metric may include physical parameters such as a foveal pixel density or a foveal range of spatial frequencies supported by a retina of a human eye for a portion of the image, or purely logical factors such as perceptual importance of the object in the generated simulated scenery or temporal consistency of the image. Factors like saliency of the object, that is, prominence due to geometrical position of the object with respect to other objects, or even intended importance of the object in the virtual storyline, may also be accounted for in the perceptual metric. Any combination of the above metrics/parameters may be considered.

Figure 8:
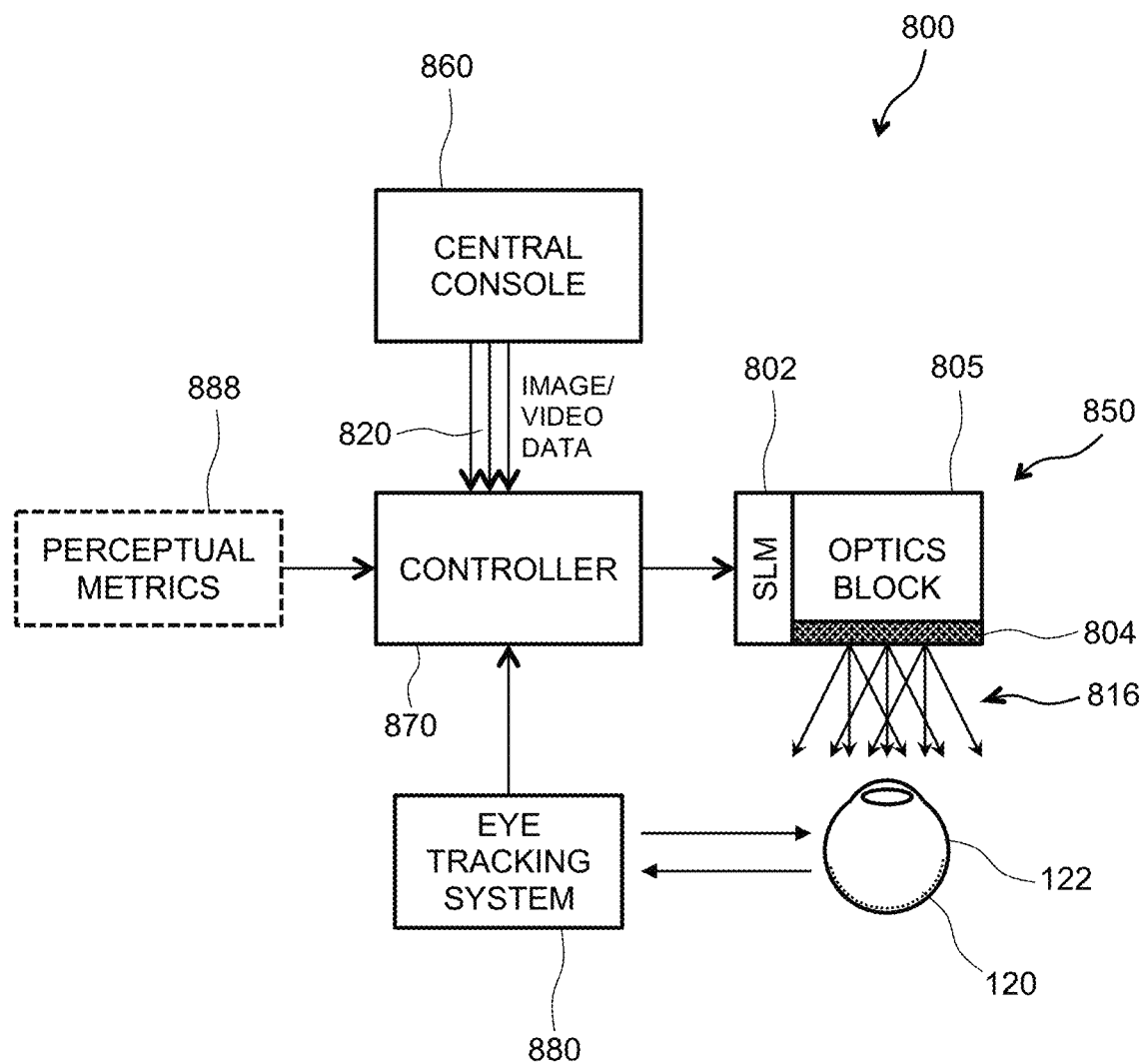
FIG. 8 is a block diagram of an NED system with coherent replication.

Referring to FIG. 8, an NED system 800 includes an NED 850 and a central console 860, both coupled to a controller 870. An eye tracking system 880 may be provided. The NED 850 is similar to the NEDs 100, 500, 600, and 700 of FIGS. 1, 5, 6, and 7 respectively. The NED 850 includes an SLM 802 for adjusting at least one parameter, i.e. amplitude, phase, and/or polarization, of spatial components of an impinging optical beam. The NED 850 also includes a replication element 804 configured for splitting, or replicating, the spatial beam components to form sub-beams 816, as described above with reference to the NEDs 100, 500, 600, and 700. An optics block 805 may be configured to optically couple the SLM 802 and the replication element 804 by focusing, coupling, and/or redirecting optical beams and sub-beams in the NED 850, as required. The controller 870 is operably coupled to the SLM 802 for adjusting the parameter(s) of the spatial beam components to cause the sub-beams 816 to form an image of the object via mutual optical interference. For embodiments where the image is to be formed directly on the retina 120 of the user's eye 122, the eye tracking system 880 determines the position and orientation of the eye 122. The controller 870 can take into account the information about the position and orientation of the eye 122 when converting VR/AR image/video data 820 from the central console 860 into data frames to be uploaded to the SLM 802. In one embodiment, the controller 870 also takes into account perceptual metrics 888, which may include the physical parameters and the logical factors described above.

In one embodiment, the NED system 800 operates in a time-sequential mode. The input optical beam impinging on the optics block 805 may include a time succession of color beams having different colors. By way of example, a red beam may be followed by a green beam followed by a blue beam, although the specific order of the beams is not important. The beams of individual colors may be monochromatic for better coherence. The controller 870 may be configured to adjust the at least one of the amplitude, phase, or polarization of at least the first portion of the sub-beams 816 for each color beam. For example, during a first time period, the red beam is provided. The red beam is split into red sub-beams, and the red sub-beams parameters are adjusted. During a following second time period, a green beam is provided, and the green sub-beams parameters are adjusted, and so on. A portion of the sub-beams of each color sequentially interfere to obtain a corresponding color component of the image field of the object on the retina 120 of the user's eye 122. The time succession of the color beams is preferably made rapid enough for the user's eye to integrate the color components of the image field of the object into a full-color image field.

Figure 9:
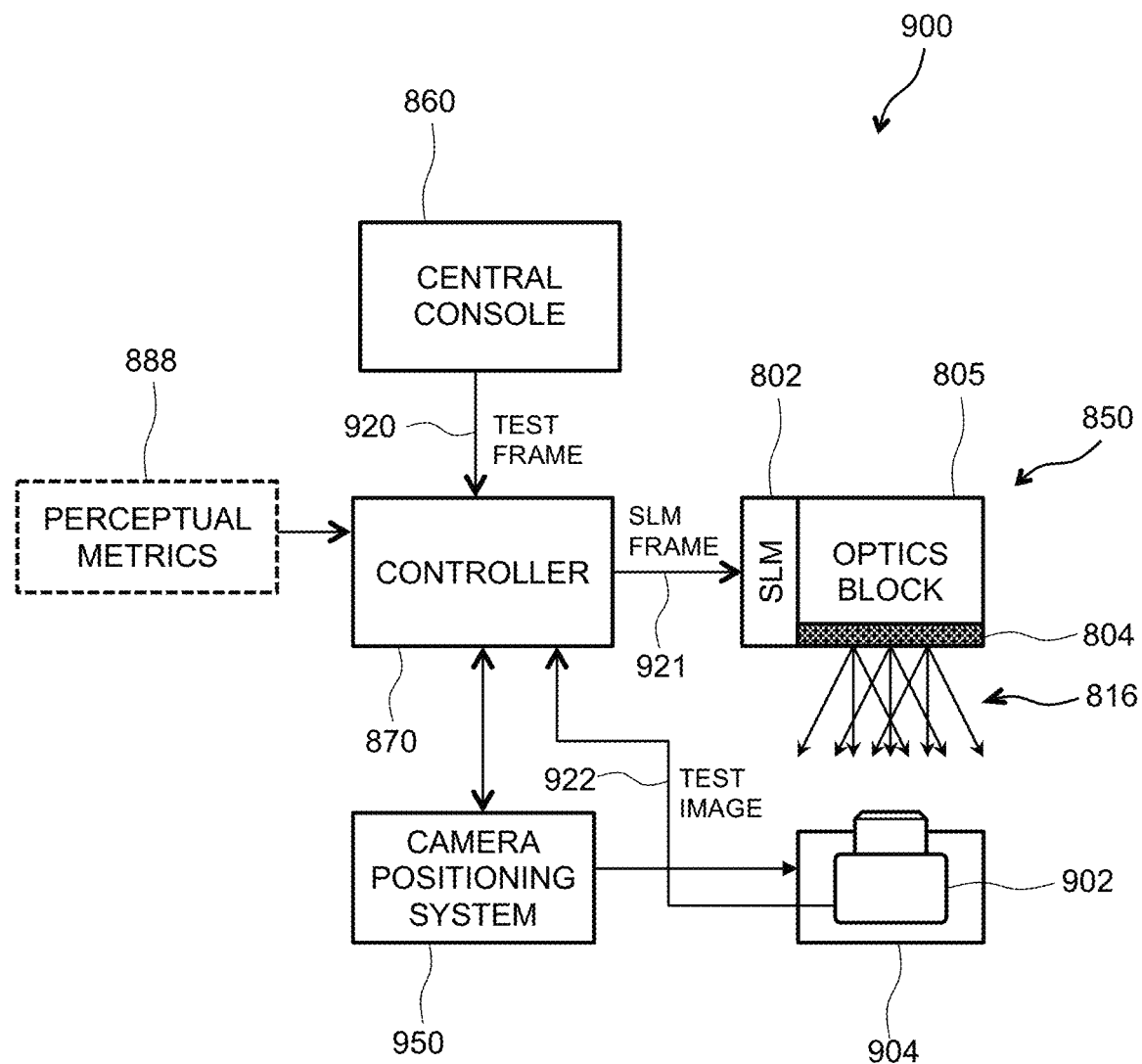
FIG. 9 is a block diagram of a calibration apparatus for an NED system.

Turning to FIG. 9, a calibration apparatus 900 can be used to calibrate the NED system 800 of FIG. 8. The calibration apparatus 900 of FIG. 9 includes a camera 902 supported by a movable platform 904, which is operably coupled to a camera positioning system 950. Preferably, the camera 902 mimics human eye in its performance, i.e. has a focal length and angular resolution corresponding to those of a human eye. The movable platform 904 can be configured to translate the camera 902 in all three linear dimensions i.e. in height, lateral offset, and depth i.e. the distance to the NED, as well as tilt the camera 902 at pitch and yaw and optionally roll angles. The movable platform 902 is controlled by the camera positioning system 950.

In one embodiment of the calibration procedure, the controller 870 positions the camera 902 at a first x, y, z coordinate and viewing angle. Then, the central console 860 uploads a test frame 920 to the controller 870. The test frame 920 can include a pattern of dots, a grid, etc. The controller 870 sends a set of corresponding parameters, termed herein an "SLM frame" 921, to the SLM 802 for generation of the test frame at the camera 902, which, as noted above, can mimic human eye. The camera 902 obtains a resulting test image 922 and sends it back to the controller 870. The controller 870 analyzes the test image 922, determining the difference between the test image 922 and the test frame 920. Based on that difference, the controller 870 updates the SLM frame 921, and the process repeats until the test image 922 seen by the camera 902 is sufficiently similar to the test frame 920. Then, the controller 870 records the calibration data based on the test frame 920 and the SLM frame 921, and positions the camera 902 at a second coordinate and angle, and the whole process repeats again until all camera 902 positions and angles have been calibrated.

In another embodiment of the calibration procedure, the central console 860 uploads a series of test frames 920 to the controller 870. The camera 902 obtains the corresponding series of test images 922 and sends the test images 922 to the controller 870. The controller 870 analyzes the series of the test images 922 and develops a model of the NED 850. The model can be used by the controller 870 to generate required images, which can include arbitrary images. This process can be repeated at different coordinates and angles, such that the model takes the eye position and orientation into account when generating the required images.

When determining the acceptable difference between the test image 922 and the test frame 920, the controller 870 can be configured to take into account the perceptual metrics 888. By way of a non-limiting example, the perceptual metrics may be accounted for as a set of parameters in a merit function used by the controller 870 to evaluate the difference between the test image 922 and the test frame 920. The calibration may be repeated at each parameter or set of parameters, of the perceptual metrics 888, and the resulting calibration data may be recorded in any suitable form, e.g. as a set of functional parameters, a look-up table (LUT), etc.

Figure 10:
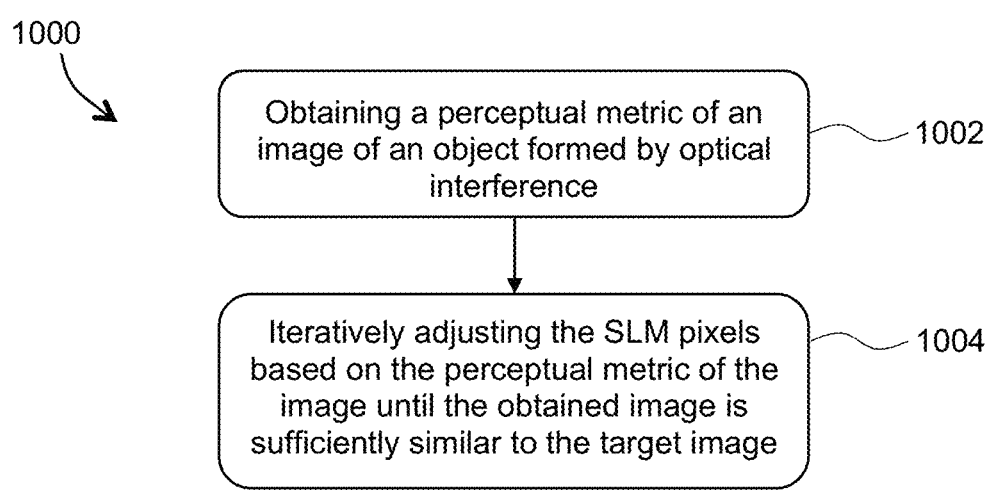
FIG. 10 is a flow chart of a method of calibration of an NED with coherent replication.

The perceptual metric aspect of the calibration is further illustrated in FIG. 10, showing a flow chart of a method 1000 of calibration of an NED such as the NEDs 100, 500, 600, 700, and the NED system 800. The method 1000 includes obtaining (1002) a perceptual metric of an image of an object formed by optical interference of at least a first portion of the sub-beams (e.g. the sub-beams 816) split from different spatial beam components and propagating in a direction of an eyebox of the NED. Then, the SLM pixels are adjusted (1004) based on the perceptual metric of the image until the obtained image is sufficiently similar to the target image by employing an iterative process described above with reference to FIG. 9.

Figure 11:
FIG. 11 is a simulation of light field generated by an NED of the present disclosure, showing increased spatial resolution at the center of the image.

Examples of perceptual metrics based optimization will now be presented. Referring to FIG. 11, a simulated light field generated by an NED of the present disclosure from a target image of a sports car has an increased spatial resolution at the center of the image, while showing a more grainy image structure at edges of the image. This image is a result of a perceptual metrics based optimization where spatial constraints have been applied to increase the resolution at the expense of lower resolution, resulting in higher levels of noise at other regions, i.e. the edges, of the image. The spatial constraints included the gaze-dependent spatial resolution, that is, the increased effective number of "pixels" (i.e. discernible elements of the image) at the center of the image. It is noted that, during operation of the NED, the effective number of pixels may be changed "on the fly" in software, that is, without using a dedicated specific hardware structure. This allows one to tie the area of increased sharpness of the image to the gaze direction of the user as determined by an eye tracking system. Herein, the term "software" is to be understood broadly, i.e. including software, firmware, field-programmable gate arrays (FPGA), etc. It is noted that by using the "software" as defined herein, the display resolution of the NED may be changed computationally, rather than optically.

Figure 12A:
FIG. 12A is a simulation of light field generated by an NED of the present disclosure on a retina of a user's eye, with spatial frequency optimization of the image leaving high spatial frequencies unconstrained.
Figure 12B:
FIG. 12B is a magnified partial view of FIG. 12A, showing granular structure of the image.
Figure 13:
FIG. 13 is an image as may be perceived by the user, where the eye filters out unconstrained high spatial frequencies.

Utilization of spatial frequency constraints may result in a high image quality at the user's eye retina despite having fewer degrees of freedom than addressable virtual pixels corresponding to maximum resolving power of human eye. One approach to increasing a perceived image quality may include only constraining only the lower spatial frequencies that the SLM has enough degrees of freedom to address. Note that these lower frequencies may still be at or above the spatial frequencies that the human eye is able to resolve, while leaving higher spatial frequencies, that is, spatial frequencies that are above the eye's resolution, unconstrained. This approach is illustrated in FIGS. 12A, 12B, and FIG. 13. Referring first to FIG. 12A, a simulated light field on a retina of the user's eye is presented. In this simulation's optimization, only spatial frequencies below some threshold were constrained. This approach resulted in "noisiness" of the image, which is seen particularly well in FIG. 12B. Turning now to FIG. 13, the image perceived by the user is much "cleaner" than the image of FIG. 12A, since it is may be unable to resolve the higher spatial frequencies. The perceived image of FIG. 13 was obtained by downsampling the "noisy" image of FIGS. 12A and 12B. The downsampling represents the filtering out of the higher spatial frequencies by the user eye, e.g. by the pupil of the eye. It is further noted that the constraining of the spatial frequencies may be made gaze-dependent. For example, the foveal range of spatial frequencies may be constrained only for a foveal area of the image as determined by an eye tracking system.

Figure 14A:
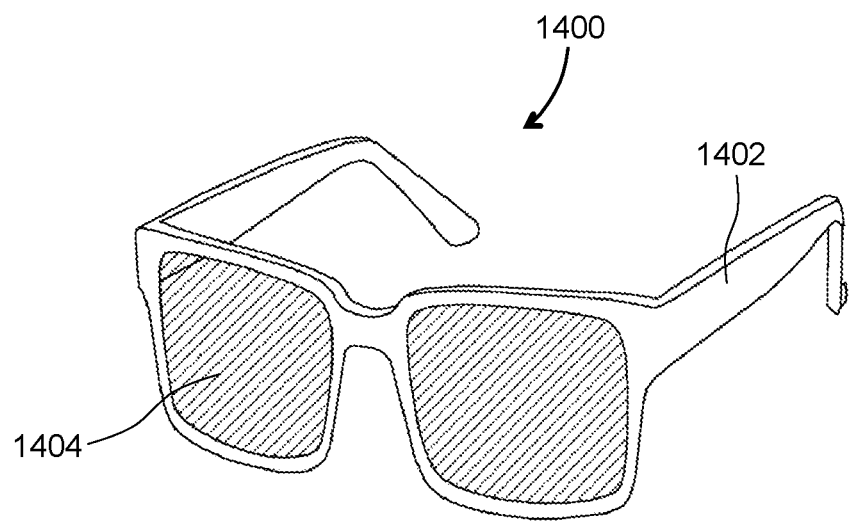
FIG. 14A is an isometric view of an eyeglasses form factor near-eye AR/VR display incorporating a replicating element of the present disclosure and an eye-tracking system.
Figure 14B:
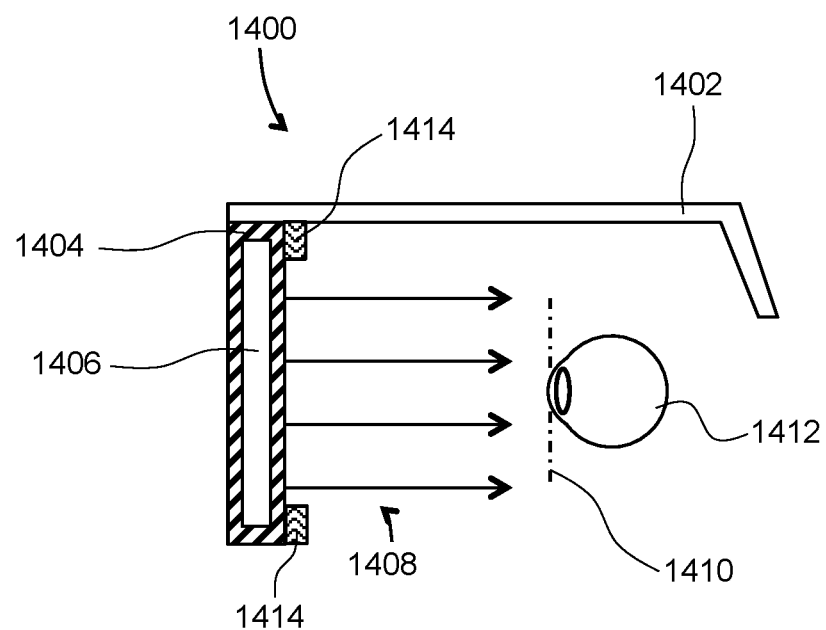
FIG. 14B is a side cross-sectional view of the display of FIG. 14A.

Referring to FIGS. 14A and 14B, a near-eye coherent AR/VR display 1400 is an embodiment of the NEDs 100, 500, 600, 700, and the NED system 800 of FIGS. 1, 5, 6, 7, and 8 respectively. A body or frame 1402 of the near-eye coherent AR/VR display 1400 has a form factor of a pair of eyeglasses, as shown. A display 1404 includes a display assembly 1406 (FIG. 14B) provides image light 1408 to an eyebox 1410, i.e. a geometrical area where a good-quality image may be presented to a user's eye 1412. The display assembly 1406 may include a separate coherent-replication VR/AR display module for each eye, or one coherent-replication VR/AR display module for both eyes. For the latter case, an optical switching device may be coupled to a single electronic display for directing images to the left and right eyes of the user in a time-sequential manner, one frame for left eye and one frame for right eye. The images are presented fast enough, i.e. with a fast enough frame rate, that the individual eyes do not notice the flicker and perceive smooth, steady images of surrounding virtual or augmented scenery. An SLM of the display assembly 1406 may include, for example and without limitation, a liquid crystal display (LCD), a liquid crystal on silicon (LCoS) display, a piston-type MEMS array, a tiltable MEMS array, an optical phased array, or a combination thereof. The near-eye coherent AR/VR display 1400 may also include an eye-tracking system 1414 for determining, in real time, the gaze direction and/or the vergence angle of the user's eyes 1412. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, dynamically creating additional objects or pointers, etc. Furthermore, the near-eye coherent AR/VR display 1400 may include an audio system, such as small speakers or headphones.

Figure 15:
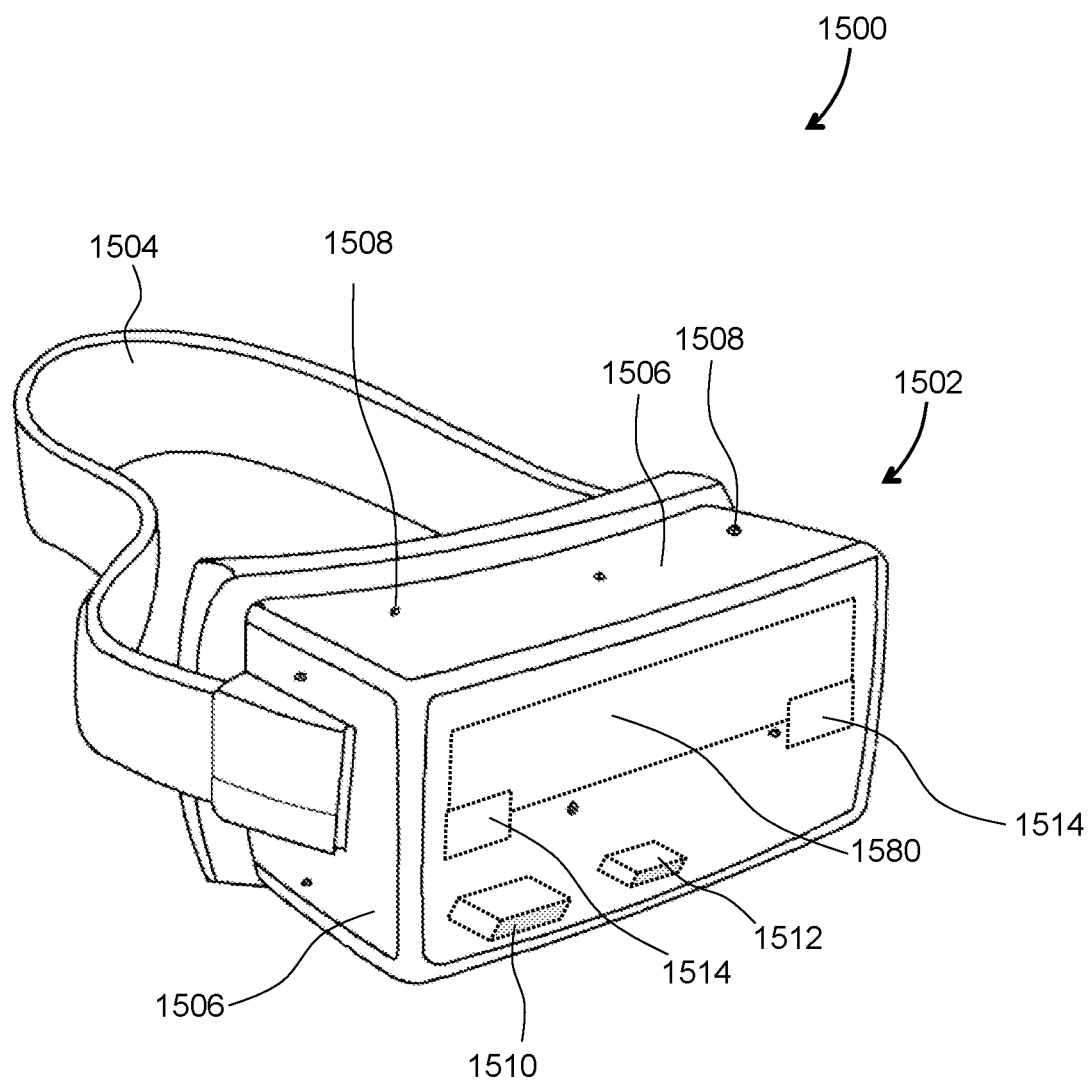
FIG. 15 is an isometric view of a head-mounted display (HMD).

Turning now to FIG. 15, an HMD 1500 is an example of an AR/VR wearable display system which encloses the user's face, for a greater degree of immersion into the AR/VR environment. The HMD 1500 can present content to a user as a part of an AR/VR system, which may further include a user position and orientation tracking system, an external camera, a gesture recognition system, control means for providing user input and controls to the system, and a central console for storing software programs and other data for interacting with the user for interacting with the AR/VR environment. The function of the HMD 1500 is to augment views of a physical, real-world environment with computer-generated imagery, and/or to generate the entirely virtual 3D imagery. The HMD 1500 may include a front body 1502 and a band 1504. The front body 1502 is configured for placement in front of eyes of a user in a reliable and comfortable manner, and the band 1504 may be stretched to secure the front body 1502 on the user's head. A display system 1580 may include the NEDs 100, 500, 600, 700, and the NED system 800 of FIGS. 1, 5, 6, 7, and 8 respectively. The display system 1580 may be disposed in the front body 1502 for presenting AR/VR imagery to the user. Sides 1506 of the front body 1502 may be opaque or transparent.

In some embodiments, the front body 1502 includes locators 1508, an inertial measurement unit (IMU) 1510 for tracking acceleration of the HMD 1500, and position sensors 1512 for tracking position of the HMD 1500. The locators 1508 are traced by an external imaging device of a virtual reality system, such that the virtual reality system can track the location and orientation of the entire HMD 1500. Information generated by the IMU and the position sensors 1512 may be compared with the position and orientation obtained by tracking the locators 1508, for improved tracking of position and orientation of the HMD 1500. Accurate position and orientation is important for presenting appropriate virtual scenery to the user as the latter moves and turns in 3D space.

The HMD 1500 may further include an eye tracking system 1514, which determines orientation and position of user's eyes in real time. The obtained position and orientation of the eyes allows the HMD 1500 to determine the gaze direction of the user and to adjust the image generated by the display system 1580 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1502.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A near-eye display (NED) comprising:
   a spatial light modulator (SLM) comprising a plurality of pixels for controlling at least one of amplitude, phase, or polarization of an optical beam impinging thereon, wherein the optical beam includes spatial beam components corresponding to individual pixels of the SLM; and
   a replication element comprising a plurality of light-scattering features for receiving and splitting the spatial beam components into a plurality of sub-beams for simultaneous propagation in a plurality of directions to cause a first portion of the sub-beams split from different spatial beam components and propagating in a direction of an eyebox of the NED undergo optical interference therebetween at the eyebox to obtain an image of an object;
   wherein the light-scattering features of the replication element are configured to provide multiple overlapping copies of wavefront of the corresponding impinging spatial beam components for propagation at pseudo-random angles;
   wherein the replication element comprises at least one of: a volume hologram, a polarization-sensitive element, a metasurface, or a time-multiplexed switchable element; and
   wherein the replication element is configured to split the spatial beam components into the plurality of sub-beams, and to propagate external light substantially without change of a wavefront or spatial power density distribution of the external light for at least one of: a duration of time, a pre-defined spectral band, or a pre-defined polarization of the external light.

2. The NED of claim 1, wherein the replication element is disposed downstream of the SLM.

3. The NED of claim 1, wherein the light-scattering features of the replication element are pseudo-randomly disposed across an aperture of the replication element; and
   wherein the light-scattering features are configured to send the sub-beams in pseudo-random directions.

4. The NED of claim 1, wherein the light-scattering features of the replication element are configured to direct the sub-beams predominantly in a direction of the eyebox.

5. The NED of claim 1, wherein the plurality of directions comprise a substantially uniform distribution of directions.

6. The NED of claim 1, wherein the replication element comprises at least one of: a phase mask, an amplitude mask, a polarization mask, a refractive surface, a diffuser, a diffraction grating, a holographic grating, a metasurface, or a microlens array.

7. The NED of claim 1 further comprising an optical waveguide, wherein the replication element is supported by the optical waveguide.

8. The NED of claim 1, wherein the replication element is configured to increase etendue of the NED by up to eight times.

9. The NED of claim 8, wherein a maximum redirection angle of the replication element is up to eight times larger than a maximum beam deviation angle of the SLM.

10. The NED of claim 1, further comprising a controller operably coupled to the SLM and configured to adjust the at least one of amplitude, phase, or polarization of the first portion of the sub-beams to make the sub-beams of the first portion undergo the optical interference therebetween at the eyebox to obtain the image of the object.

11. The NED of claim 10, wherein in operation, the sub-beams undergo the optical interference on a retina of a user's eye at the eyebox.

12. The NED of claim 11, further comprising an eye tracking system for determining at least one of eye position or eye orientation of the user's eye, wherein the controller is configured to adjust the at least one of amplitude, phase, or polarization of the first portion of the sub-beams depending on the at least one of eye position or eye orientation determined by the eye tracking system.

13. The NED of claim 10, wherein the controller is configured to adjust the SLM pixels to optimize the image of the object based upon a perceptual metric of the image;
wherein the perceptual metric comprises at least one of: a range of spatial frequencies supported by a retina of a human eye for a portion of the image, perceptual importance of the object or a feature thereof, temporal consistency of the image, saliency of the object, or a range of lower image spatial frequencies supported by available degrees of freedom of the SLM.

* * * * *